US012657671B2

(12) United States Patent
Qiu et al.

(10) Patent No.: US 12,657,671 B2
(45) Date of Patent: Jun. 16, 2026

(54) VIDEO NOISE REDUCTION METHOD AND VIDEO NOISE REDUCTION SYSTEM BASED ON PORTRAIT MODE

(71) Applicant: REALTEK SEMICONDUCTOR CORP., Hsinchu (TW)

(72) Inventors: Zhong-Yi Qiu, Hsinchu (TW);
Wen-Tsung Huang, Hsinchu (TW);
Yao-Jia Kuo, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 394 days.

(21) Appl. No.: 18/528,994

(22) Filed: Dec. 5, 2023

(65) Prior Publication Data

US 2024/0394848 A1    Nov. 28, 2024

(30) Foreign Application Priority Data

May 23, 2023    (TW) ................................. 112119016

(51) Int. Cl.
*G06K 9/00*        (2022.01)
*G06T 3/40*        (2006.01)
*G06T 5/20*        (2006.01)
*G06T 5/50*        (2006.01)
*G06T 5/70*        (2024.01)
        (Continued)

(52) U.S. Cl.
CPC .................. *G06T 5/70* (2024.01); *G06T 3/40* (2013.01); *G06T 5/20* (2013.01); *G06T 5/50* (2013.01); *G06T 7/12* (2017.01); *G06T 7/136* (2017.01); *G06T 7/194* (2017.01); *G06T 7/248* (2017.01); *G06T 2207/10016* (2013.01); *G06T 2207/20021* (2013.01); *G06T 2207/20076* (2013.01);
        (Continued)

(58) Field of Classification Search
CPC .................................... G06T 5/70; G06T 5/50
See application file for complete search history.

(56) References Cited

U.S. PATENT DOCUMENTS

2003/0053692 A1*    3/2003    Hong ........................ G06T 7/11
                                                            375/E7.081

FOREIGN PATENT DOCUMENTS

CN        103795976 B        9/2017
CN        116029895 A    *    4/2023
            (Continued)

*Primary Examiner* — Molly Wilburn
*Assistant Examiner* — Aidan Keup
(74) *Attorney, Agent, or Firm* — Li & Cai Intellectual Property (USA) Office

(57)        ABSTRACT

A video noise reduction method and a video noise reduction system based on a portrait mode are provided. The method includes configuring a processor to perform: inputting a current image into a portrait mode model to generate a current portrait probability image; executing a post-processing process, including performing a binarization process on the current portrait probability image to generate a mask image and executing a contour extraction process to extract a foreground region, a background region and a contour region; performing a filtering process, including: executing a motion detection process to locate a motion region and a stationary region; performing a time-domain filtering operation on the stationary region; for the motion region, obtaining a similar part of the previous image and a degree of difference of the similar part, so as to determine whether to compensate the motion region or to perform a spatial domain filtering operation.

20 Claims, 8 Drawing Sheets

(51) Int. Cl.
*G06T 7/12*          (2017.01)
*G06T 7/136*        (2017.01)
*G06T 7/194*        (2017.01)
*G06T 7/246*        (2017.01)

(52) U.S. Cl.
CPC ............... *G06T 2207/20182* (2013.01); *G06T 2207/30196* (2013.01)

(56)              References Cited

FOREIGN PATENT DOCUMENTS

| | | | |
|----|------------|---|--------|
| TW | 201828691 | A | 8/2018 |
| TW | I777092 | B | 9/2022 |

* cited by examiner

Inputting current image into portrait mode model to generate current portrait probability image ~S10

Executing post-processing process ~S11

Executing filtering process ~S12

Outputting filtered stationary region and motion region to generate filtered current image ~S13

Enlarging current portrait probability image from 2nd image size to 1st image size　～S110

Performing binarization process on current portrait probability image according to probability threshold to generate mask image　～S112

Performing contour extraction process to extract foreground region, background region and contour region　～S114

IMG

MK

A1

A2

VIDEO NOISE REDUCTION METHOD AND VIDEO NOISE REDUCTION SYSTEM BASED ON PORTRAIT MODE

CROSS-REFERENCE TO RELATED PATENT APPLICATION

This application claims the benefit of priority to Taiwan Patent Application No. 112119016, filed on May 23, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a noise reduction method and a noise reduction system, and more particularly to a video noise reduction method and a video noise reduction system based on a portrait mode.

BACKGROUND OF THE DISCLOSURE

Video noise suppression uses two main techniques: conventional image processing and neural networks (NN). For the conventional image processing, time-domain noise suppression can achieve better noise suppression, which performs time-domain filtering on a current image according to information of previous image to achieve noise reduction. However, the time-domain noise suppression can preserve details better than spatial domain noise suppression, which causes loss of detail.

Since a ghosting effect may be produced for moving objects when the time-domain noise suppression is performed, a motion detection is necessary for the moving objects to avoid the ghosting effect. However, the above-mentioned motion detection is difficult to determine whether a change of an image is caused by real movement of objects or noises in an ultra-low-brightness environment with strong noise intensity, and thus fails to achieve a good noise suppressing effect.

In addition, in the existing noise suppression technology, a noise suppression based on a neural network model may also be utilized. An image with noises can be input into the neural network model, and a noise-suppressed image can be output. However, since a size of the input image determines a scale of the neural network model, it is difficult for high-resolution images that need excessive computations to achieve real-time computing, and level of noise suppression is usually limited by training data.

SUMMARY OF THE DISCLOSURE

In response to the above-referenced technical inadequacies, the present disclosure provides a video noise reduction method and a video noise reduction system based on a portrait mode.

In one aspect, the present disclosure provides a video noise reduction method based on a portrait mode, and the video noise reduction method includes: configuring a processor to perform: inputting a current image into a portrait mode model to generate a current portrait probability image, wherein the current portrait probability image defines a probability that each sub-region in the current input image belongs to a foreground portrait; performing a post-processing process, including: performing a binarization process on the current portrait probability image according to a probability threshold to generate a mask image; and performing a contour extraction process to extract a foreground region, a background region and a contour region. The method further includes configuring the processor to perform a filtering process, which includes: performing a motion detection process to compare the current image with a previous image, and locate a motion region and a stationary region from the current image according to the extracted foreground region, the background region and the contour region. The method further includes configuring the processor to: perform a time-domain filtering operation on the stationary region; obtain, for the motion region, a similar part of the previous image that is similar to the current image and obtaining a degree of difference of the similar part, so as to determine whether to compensate the motion region with the similar part or to perform a spatial domain filtering operation; and output the filtered stationary region and the motion region to generate the filtered current image.

In another aspect, the present disclosure provides a video noise reduction system based on a portrait mode, and the system includes a processor and a memory. The memory stores a plurality of computer-readable instructions, a current image and a previous image. the processor is configured to read the computer-readable instructions, and perform the following steps: inputting a current image into a portrait mode model to generate a current portrait probability image, which defines a probability that each sub-region in the current input image belongs to a foreground portrait; performing a post-processing process that includes: performing a binarization process on the current portrait probability image according to a probability threshold to generate a mask image; and performing a contour extraction process to extract a foreground region, a background region and a contour region. The method further includes configuring the processor to perform a filtering process, which includes: performing a motion detection process to compare the current image with a previous image, and locate a motion region and a stationary region from the current image according to the extracted foreground region, the background region and the contour region. The method further includes configuring the processor to: perform a time-domain filtering operation on the stationary region; obtain, for the motion region, a similar part of the previous image that is similar to the current image and obtaining a degree of difference of the similar part, so as to determine whether to compensate the motion region with the similar part or to perform a spatial domain filtering operation; and output the filtered stationary region and the motion region to generate the filtered current image.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
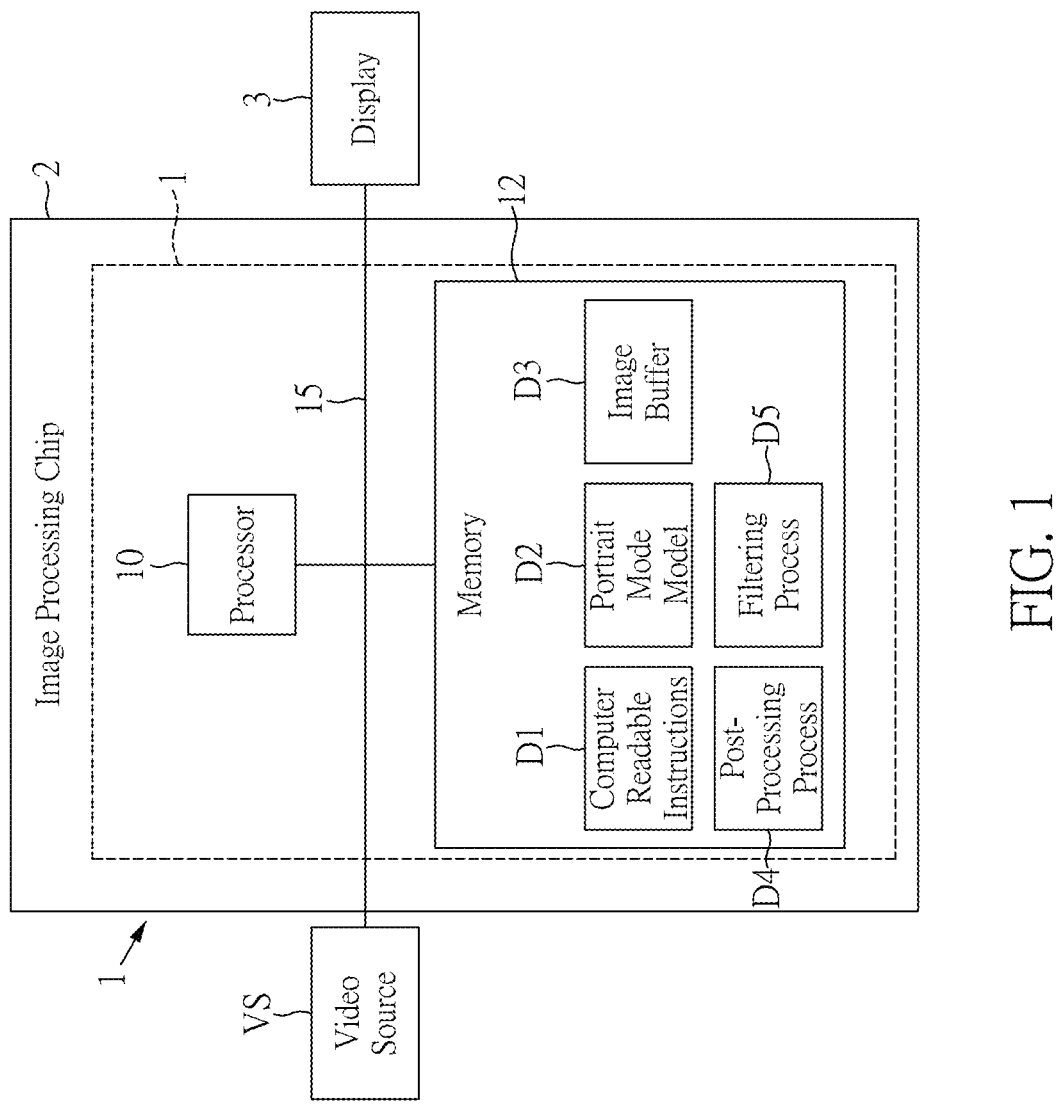
FIG. 1 is a functional block diagram of a video noise reduction system according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

FIG. 1 is a functional block diagram of a video noise reduction system according to one embodiment of the present disclosure. Referring to FIG. 1, one embodiment of the present disclosure provides a video noise reduction system 1 based on a portrait mode, and the video noise reduction system includes a processor 10 and a memory 12. The processor 10 and the memory 12 can be arranged, for example, in an image processing chip 2, and the image processing chip 2 is used to receive a video source VS, process an image signal provided by the video source VS, and display the processed image signal on a display 3. In the present disclosure, the portrait mode is combined with the noise reduction technology when the processor 10 processes the video signal input by the video source VS, so as to achieve a clear display effect with good image quality. The processor 10 is electrically coupled to the memory 12 and configured to access computer readable instructions D1 from the memory 10. The memory 12 can be any storage device for storing data, such as, but not limited to, a random-access memory (RAM), a read only memory (ROM), a flash memory, a hard disk or other storage device that can be used to store data. The memory 12 at least stores a plurality of computer-readable instructions D1. In one embodiment, an image buffer D3 is divided from the memory 10 and can be used to store a current image and a previous image from the video source VS, a temporary image generated by the processor 12 when performing operations, and a portrait mode model D2, a post-processing process D4 and a filtering process D5 that are used in subsequent steps.

Figure 2:
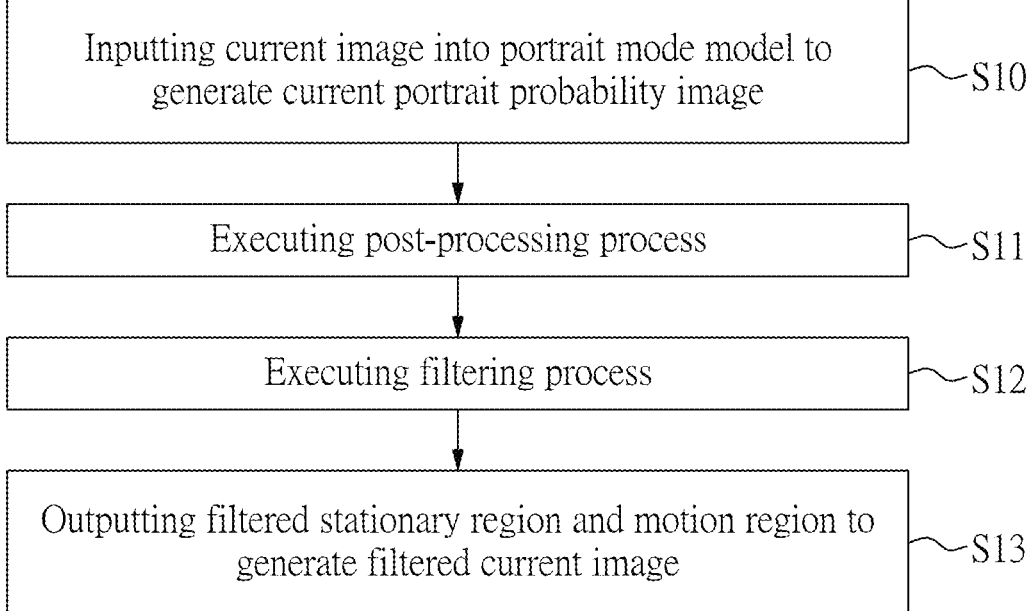
FIG. 2 is a flowchart of a video noise reduction method based on a portrait mode according to one embodiment of the present disclosure

Reference is made to FIG. 2, which is a flowchart of a video noise reduction method based on a portrait mode according to one embodiment of the present disclosure. It should be noted that the video noise reduction method provided by the present disclosure can be applied to different color spaces, such as Gray, Raw, RGB, YUV and other color spaces.

As shown in FIG. 2, the video noise reduction method includes configuring the processor 10 to perform the following steps:

Step S10: inputting a current image into the portrait mode model to generate a current portrait probability image. In detail, the current input image includes a plurality of sub-regions (e.g., pixels), and the current portrait probability image defines a probability that each sub-region in the current input image belongs to a foreground portrait. The portrait mode model D2 can be trained based on deep learning algorithms, including, but not limited to, Yolact++, PortraitNet and Deeplabv3+. In response to the current image being input into the executing portrait mode model D2, the portrait mode model D2 outputs a segmentation result to distinguish a background region and a foreground portrait region. More precisely, the portrait mode model D2 can determine the probability that each sub-region (each pixel) of the current image belongs to the foreground portrait, and can express such probability by, for example, a value ranging from 0 to 1 (that is, 0% to 100%) correspondingly in the current portrait probability image. However, a type of the portrait mode model D2 mentioned above is merely an example, and various existing portrait capturing models can also be utilized.

In detail, the portrait mode model D2 is trained to distinguish (divide) the foreground portrait from the background in a target image. In this embodiment, the following training process can be used to train the portrait mode model D2. A target training image is selected from an image sample data set including multiple denoted images and input into the portrait mode model for processing, and a segmentation result of the target training image can be obtained.

Next, a loss function is determined according to the segmentation result corresponding to the target training image and a denoted segmentation label. The portrait mode model D2 is trained according to the loss function, that is, parameters of the portrait mode model D2 can be updated according to the loss function. Finally, the portrait mode model D2 is repeatedly trained according to the loss function, and each time the training is performed, it is determined whether or not a predetermined termination condition for the training is satisfied. If the termination condition is not met, the training is continued until the termination condition is met, and a trained portrait mode model D2 is generated.

Since a size of the input image determines a scale of the neural network model, it is difficult for high-resolution images that need excessive computations to achieve real-time computing. In other embodiments of step S10, to achieve real-time computing, the current image can be reduced from a first image size to a second image size corresponding to the portrait mode model D2, and then input into the portrait mode model D2. For example, for the video source VS with a resolution of 4K, the (initial) first image size of the current image is 3840×2160, and the current image can be reduced to the second image size of 224×160, for example, through a bilinear interpolation algorithm. The image size mentioned above, however, is merely an example, and the present disclosure is not limited thereto. Since the image with a smaller size (224×160) is input to the portrait mode model D2, the amount of computation can be reduced for achieving real-time computing.

Figure 3:
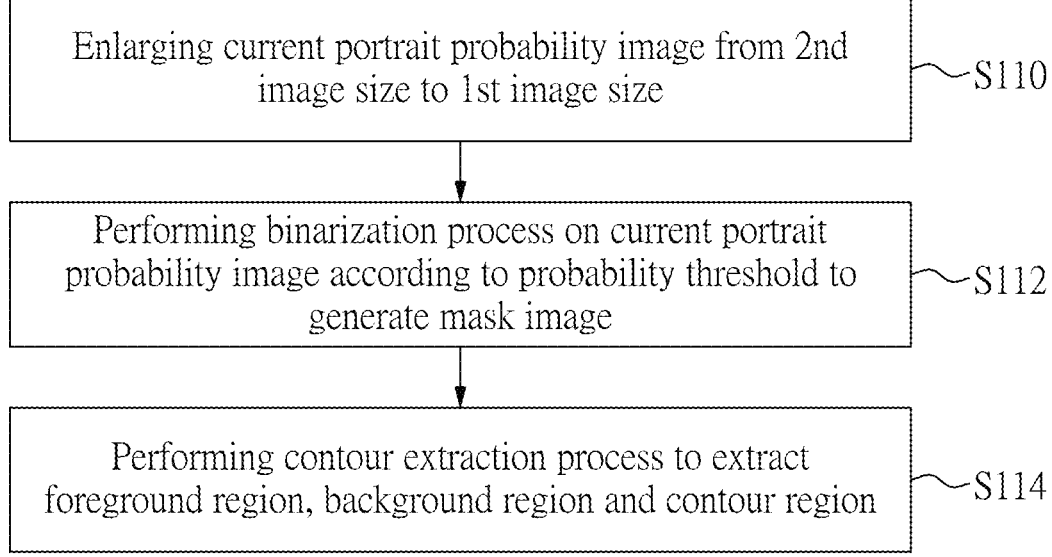
FIG. 3 is a detailed flowchart of step S11 in FIG. 2.

Step S11: executing a post-processing process. Reference is made to FIG. 3, which is a detailed flowchart of step S11 in FIG. 2. As shown in FIG. 3, the post-processing process mainly performs processing steps such as amplification, binarization, and contour extraction, and can include the following steps:

Step S110: enlarging the current portrait probability image from the second image size to the first image size. In detail, if the current image is reduced in step S10, the current portrait probability image will correspond to the second image size, and step S110 is required to restore the size of the current portrait probability image. Similarly, the current portrait probability image can be enlarged from the second image size to the first image size through the bilinear interpolation algorithm.

Step S112: performing a binarization process on the current portrait probability image according to a probability threshold to generate a mask image.

Figure 4:
FIG. 4 is a schematic diagram of a current image according to one embodiment of the present disclosure.
Figure 5:
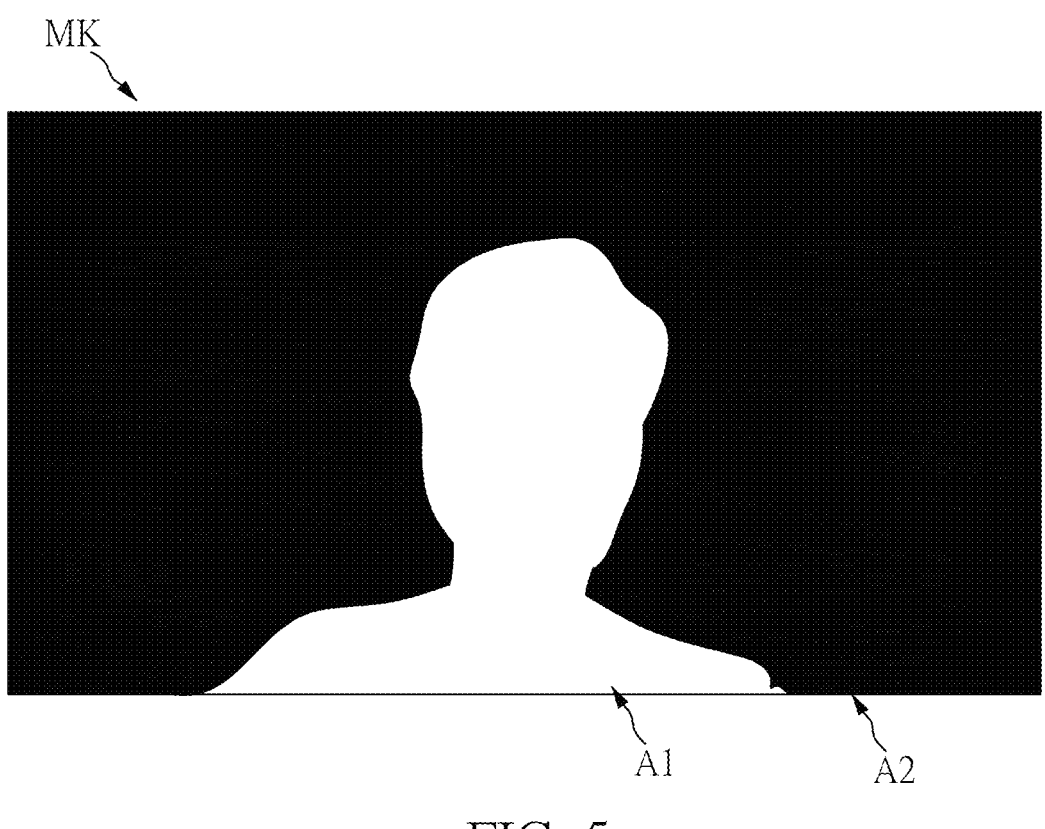
FIG. 5 is a schematic diagram of a mask image.

This step is mainly used to extract parts belonging to the foreground portrait and the background from a result of a foreground-background separation made by the portrait mode model D2. Reference is made to FIGS. 4 and 5, where FIG. 4 is a schematic diagram of a current image according to one embodiment of the present disclosure, and FIG. 5 is a schematic diagram of a mask image. As shown in FIGS. 4 and 5, after the current image IMG is input into the portrait mode model D2, the portrait probability image can be generated, and the binarization process can include setting the sub-regions (e.g., pixels) having probabilities that are greater than or equal to the probability threshold in the current portrait probability image as a first value (such as a region A1 shown in FIG. 5), and setting the sub-regions having probabilities that are smaller than the probability threshold as a second value (such as a region A2 shown in FIG. 5), so as to generate the mask image MK. The mask image MK has a plurality of mask sub-regions (e.g., pixels) corresponding to the sub-regions of the current portrait probability image.

For example, step S112 can be expressed as the following equation (1):

$$\text{Mask}(i, j) = \begin{cases} 1, & \text{Probability}(i, j) \geq TH \\ 0, & \text{Probability}(i, j) < TH \end{cases}; \qquad \text{Equation (1)}$$

where Mask is the mask image MK, Mask(i,j) represents a value of the mask image at coordinate (i,j), and Probability(i,j) is the probability of the current portrait probability image at coordinate (i,j) (between 0 and 1), and TH is the probability threshold. TH can be set to 0.5, as shown in equation (1), when Probability(i,j) is 0.7, then the corresponding Mask(i,j) is set to 1. Therefore, in the mask image MK, the sub-regions with higher probabilities of belonging to the foreground portrait is set to 1, and the remaining sub-regions with higher probabilities of belonging to the background are set to 0.

Step S114: performing a contour extraction process to extract a foreground region, a background region and a contour region. In detail, the main purpose of step S114 is to detect a transition region between the foreground portrait and the background, that is, the contour region of a human figure.

It should be noted that if the contour extraction step is omitted, subsequent adjustments (e.g., noise suppression processing) can merely be made on the two regions of the foreground portrait and the background. A level of the noise suppression depends on the accuracy of the portrait mode model D2, if an accuracy of the portrait mode model D2 is insufficient, the noise suppression may be poor for a boundary region between the foreground portrait and the background. In other words, a ghosting effect may be present in the boundary region between the foreground portrait and the background.

Figure 6:
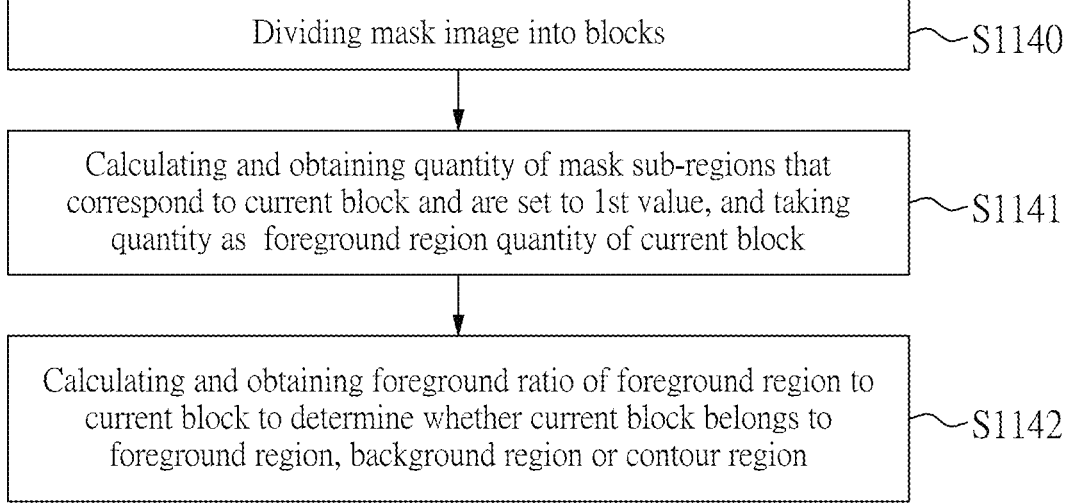
FIG. 6 is a detailed flowchart of step S114 in FIG. 3.

Reference is made to FIG. 6, which is a detailed flowchart of step S114 in FIG. 3.

Step S1140: dividing the mask image into a plurality of blocks. Specifically, in step S1140, a block radius can be set first, and the blocks are divided from the mask image according to the block radius. Optionally, the blocks containing both the foreground portrait and the background can be selected first, that is, the blocks located in the transition region between the foreground portrait and the background. More precisely, according to the setting manner of the above steps, the blocks containing the mask sub-regions set to the first value and the second value can be selected, thereby saving computation resources and time required for subsequent processing.

Next, the following steps are performed for each of the (selected) blocks:

Step S1141: calculating and obtaining a quantity of the mask sub-regions that correspond to a current block and are set to the first value, and taking the quantity as a foreground region quantity of the current block.

This step can be expressed by the following equation (2):

$$\text{Number}(i, j) = \sum_{i-r}^{i+r} \sum_{j-r}^{j+r} \text{Mask}(a, b), \qquad \text{Equation (2)}$$

$$i - r \leq a \leq i + r, \ j - r \leq b \leq j + r;$$

where Number(i,j) represents a quantity of the foreground regions in the current block centered on coordinate (i,j), r is the block radius, and Mask(a,b) is a value of the mask sub-region located at coordinate (a,b) in the current block. Therefore, a is within a range that is centered on i and extends with the block radius (that is, i−r to i+r), and b is within a range that is centered on j and extends with the block radius (i.e., j−r to j+r). Since the value of the mask sub-block belonging to the foreground region is 1, the foreground region quantity is obtained after summing according to equation (2).

S1142: calculating and obtaining a foreground ratio of the foreground region to the current block to determine whether the current block belongs to the foreground region, the background region or the contour region. This step can be represented by the following equation (3):

$$\text{Mask\_Ratio}(i, \ j) = \text{Number}(i, \ j)/(2*r+1)^2; \quad \text{Equation (3)}$$

where Mask_Ratio(i,j) represents foreground ratio of the foreground region to the current block centered on coordinate (i,j), Number(i,j) is the foreground region quantity in the current block, and $(2*r+1)^2$ represents a total quantity of the mask sub-regions of the current block obtained according to the block radius r.

Figure 7:
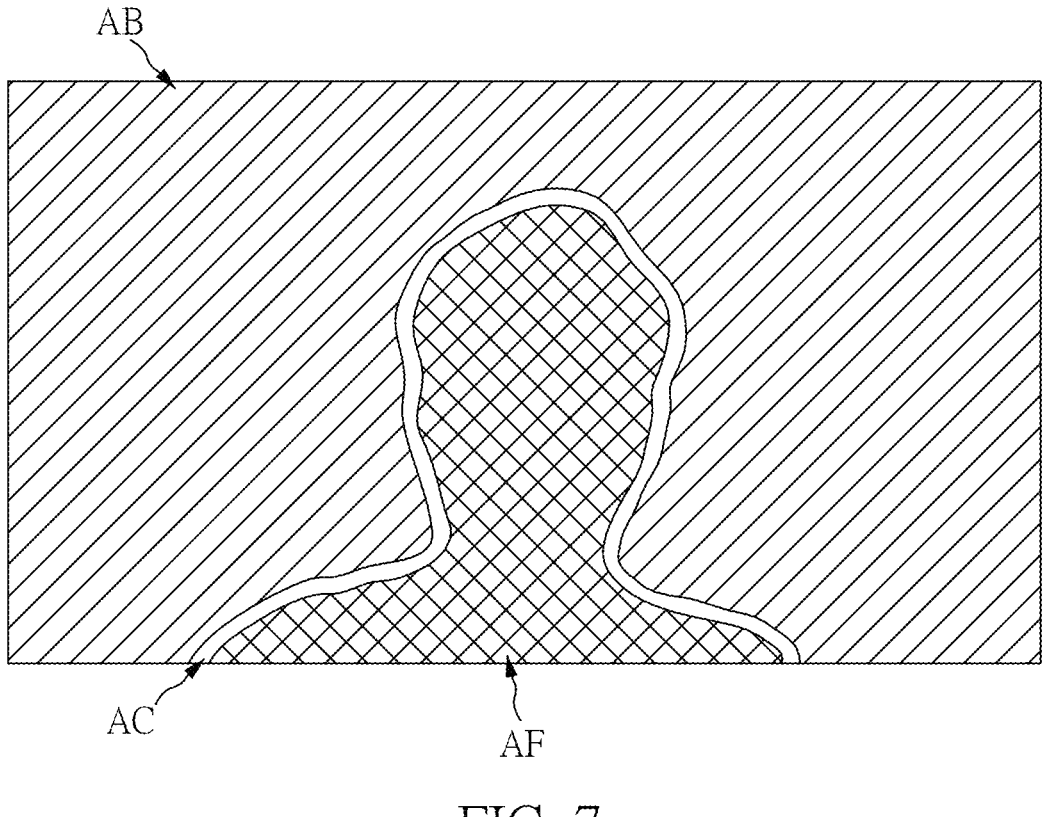
FIG. 7 is a schematic diagram of a result showing that a foreground region, a background region, and a contour region are determined according to one embodiment of the present disclosure.

Reference is made to FIG. 7, which is a schematic diagram of a result showing that a foreground region, a background region, and a contour region are determined according to one embodiment of the present disclosure. In step S1142, the contour region AC can be determined, for example, as shown in the following equation (4):

Furthermore, the contour region can be determined according to the following equation (4):

$$\text{Contour}(i, \ j) = \begin{cases} 1, \ \text{Contour\_TH\_L} \leq \text{Mask\_Ratio}(i, \ j) \leq \text{Contour\_TH\_H} \\ 0, \ \text{otherwise} \end{cases} ; \quad \text{Equation (4)}$$

where Contour(i,j) is a function used to indicate whether the current block at the coordinate (i,j) belongs to the contour region AC, Contour(i,j)=1 means that the current block at the coordinate (i,j) belongs to the contour region AC, Contour(i,j)=0 means that the current block at the coordinate (i,j) does not belong to the contour region AC. In equation (4), whether the current block belongs to the contour region AC is determined according to a contour ratio range, where Contour_TH_L is a lower limit of the contour ratio range, and Contour_TH_H is an upper limit of the contour ratio range.

Therefore, when the foreground ratio is within the contour ratio range (that is, the foreground ratio Mask_Ratio(i,j) is greater than or equal to Contour_TH_L and less than or equal to Contour_TH_H), it can be determined that the current block belongs to the contour region AC.

Reference is made to the following Table 1:

| 1 | 0 | 0 |
|---|---|---|
| 1 | 1 | 0 |
| 1 | 1 | 1 |

In Table 1, the current block whose block radius r is 1 is taken as an example, and it can be calculated by $(2*r+1)^2$ that there are 9 mask sub-regions (i.e., 3*3) in the current block. Given that Contour_TH_L is 0.2, Contour_TH_H is 0.8, the number of the foreground calculated in this region is 6, the foreground ratio is 6/(3*3)=0.6666, which is between 0.2 and 0.8 and therefore Contour(i,j)=1, the current block corresponding to Table 1 belongs to the contour region AC.

Reference is made to Table 2:

| 1 | 1 | 0 |
|---|---|---|
| 1 | 1 | 1 |
| 1 | 1 | 1 |

In the current block corresponding to Table 2, the quantity of the foreground is 8, the foreground ratio is 8/(3×3) =0.8889, which exceeds 0.8 and thus Contour(i,j)=0, and the current block does not belong to the contour region AC.

In addition to the above manners, when the foreground ratio is greater than the upper limit of the contour ratio range (i.e., Contour_TH_H), it can be determined that the current block belongs to the foreground region AF; when the foreground ratio is smaller than the lower limit of the contour ratio range (i.e., Contour_TH_L), it can be determined that the current block belongs to the background region AB.

Therefore, the foreground region AF, the background region AB, and the contour region AC can be obtained as shown in FIG. 7, and the foreground region AF, the background region AB, and the contour region AC can respectively correspond to different weights that will be used in subsequent steps. To this end, the post-processing process ends.

Figure 8:
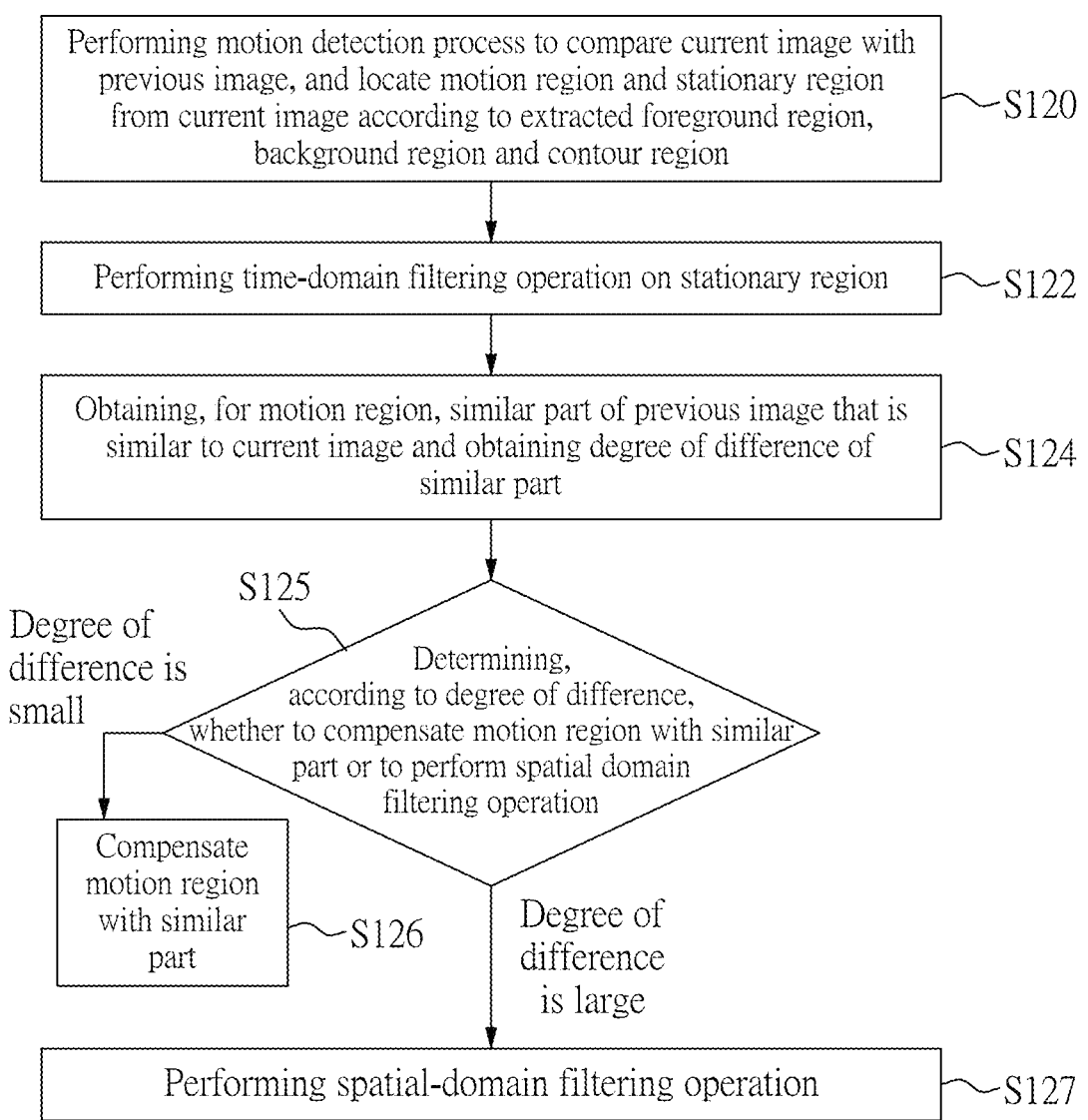
FIG. 8 is a detailed flowchart of step S12 in FIG. 2.

Reference is made to FIG. 2, the video noise reduction method proceeds to step S12: executing a filtering process. FIG. 8 is a detailed flowchart of step S12 in FIG. 2.

As shown in FIG. 8, the filtering process further includes the following steps:

Step S120: performing a motion detection process to compare the current image with a previous image, and locate a motion region and a stationary region from the current image according to the extracted foreground region, the background region and the contour region.

In detail, step S120 is performed to distinguish the motion region from the stationary region, such that different filtering methods can be utilized in subsequent steps. In some embodiments, the current image can be compared with the previous image through a frame difference method, for example, the current image is a current frame image, and the previous image is a previous frame image. Alternatively, in some embodiments, the previous frame image is a frame image processed by the aforementioned post-processing process and the filtering process of the present embodiment.

The step of comparing the current image with the previous image can be expressed by the following equation (5):

$$\text{FrameDiff}(i, \ j) = |\text{Prev}(i, \ j) - \text{Cur}(i, \ j)|; \quad \text{Equation (5)}$$

where FrameDiff(i,j) is a comparison result at coordinate (i,j), Prev(i,j) represents a pixel value of the previous image at coordinate (i,j), Cur(i,j) represents a pixel value of the current image at coordinate (i,j), and a subtraction can be performed on the two to obtain a difference therebetween.

As mentioned above, the foreground region AF, the background region AB and the contour region AC correspond to different weights, respectively, and in the motion detection process, it can be determined for each region in the current image whether it belongs to the foreground region AF, the background region AB or contour region AC. The comparison result between the current image and the previous image can be weighted according to the corresponding weights, so as to locate the motion region and the stationary region.

The following descriptions provide a method of locating the motion region and the stationary region simply by the frame difference method, and can be shown in the following equation (6):

$$\text{Motion}(i,\ j) = \begin{cases} 1, & FrameDiff(i,\ j) \geq MotionTH \\ 0, & FrameDiff(i,\ j) < MotionTH \end{cases}; \qquad \text{Equation (6)}$$

where Motion(i,j) is a function used to indicate whether a region located at coordinate (i,j) is a motion region, and MotionTH is a difference threshold. Therefore, when the comparison result at the coordinate (i,j) is greater than or equal to the difference threshold, then Motion(i,j)=1, and the region at the coordinate (i,j) is the motion region. When the comparison result at the coordinate (i,j) is less than the difference threshold, then Motion(i,j)=0, and the region at the coordinate (i,j) is the stationary region.

Based on equation (6), the foreground region AF, the background region AB or the contour region AC can be further considered. The comparison result between the current image and the previous image can be weighted according to the corresponding weights to locate the motion region, as shown in the following equation (7):

$$FrameDiffPortrait(i,\ j) = \qquad \text{Equation (7)}$$
$$\begin{cases} FrameDiff(i,\ j) \times ContourRatio,\ Contour(i,\ j) = 1 \\ FrameDiff(i,\ j) \times ForegroundRatio,\ Mask(i,\ j) = 1\ ; \\ FrameDiff(i,\ j) \times BackgroundRatio,\ \text{otherwise} \end{cases}$$

where FrameDiffPortrait(i,j) is a function used to indicate whether or not a region located at coordinate (i,j) belongs to a motion region. When the region located at the coordinate (i,j) belongs to the contour region AC (i.e., Contour(i,j)=1), then the comparison result at the coordinate (i,j) (FrameDiff(i,j)) is multiplied by weight Contour Ratio corresponding to the contour region AC. When the region at the coordinate (i,j) belongs to the foreground region AF (i.e. Mask(i,j)=1), the comparison result at the coordinate (i,j) (FrameDiff(i,j)) is multiplied by weight ForegroundRatio corresponding to the foreground region AF. Similarly, when the region at the coordinate (i,j) belongs to the background region AB (i.e., Mask(i,j)=0), the comparison result at the coordinate (i,j) (FrameDiff(i,j)) is multiplied by weight BackgroundRatio corresponding to the background region AB. Thereafter, by replacing FrameDiff(i,j) in equation (6) with FrameDiffPortrait(i,j), a result of performing the motion detection considering the foreground region AF, the background region AB or the contour region AC can be obtained. In the above steps, by dividing the image into three regions (the contour region AC, the foreground region AF, and the background region AB), and adjusting these three regions to different degrees during motion detection, good noise suppression can be achieved for the entire image and the ghosting effect can be reduced.

Step S122: performing a time-domain filtering operation on the stationary region.

The time-domain filtering operation is performed to assign proportions of the current image and the previous image for each sub-region in the stationary region according to a learning rate, as shown in the following equation (8):

$$TemporalDenoise(i,\ j) = \qquad \text{Equation (8)}$$
$$Cur(i,\ j) * LearnRate + Prev(i,\ j) * (1 - LearnRate);$$

where TemporalDenoise(i,j) represents a result of the time-domain filtering performed on a region located at coordinate (i,j), Prev(i,j) represents a pixel value of the previous image at the coordinate (i,j), Cur(i,j) represents a pixel value of the current image at the coordinate (i,j), and LearnRate represents the learning rate, that is, the proportions of the current image and the previous image in the region at the coordinate (i,j).

Step S124: obtaining, for the motion region, a similar part of the previous image that is similar to the current image and obtaining a degree of difference of the similar part.

In detail, the motion region without using time-domain filtering may have excessive noises. Therefore, a similar sub-region is located from the previous image for compensation, and if there is no similar sub-region, spatial domain filtering is performed on a current sub-region.

In this step, for each sub-region corresponding to the motion region, another sub-region that is most similar to the current sub-region can be found from the previous image, which can be expressed by the following equation (9):

$$Compensation(i,\ j) = Prev(a,\ b),\ \min|Prev(a,\ b) - Cur(i,\ j)|, \quad \text{Equation (9)}$$
$$a \in [i-r,\ i+r],\ b \in [j-r,\ j+r];$$

where Compensation(i,j) represents a value that can be used to compensate the current sub-region at coordinate (i,j), Prev(a,b) is another sub-region at coordinate (a,b) of the previous image that is found to have the smallest difference (that is, the most similar) from the sub-region Cur(i,j) at the coordinate (i,j) in the current image, and r is a search radius centered on the coordinate (i,j).

Step S125: determining, according to the degree of difference, whether to compensate the motion region with the similar part or to perform a spatial domain filtering operation.

This step can be represented by the following equation (10):

$$MotionResult(i,\ j) = \qquad \text{Equation (10)}$$
$$\begin{cases} Compensation(i,\ j),\ |Compensation(i,\ j) - Cur(i,\ j)| < DIFF\_TH \\ SpatialDenoise(i,\ j),\ |Comopensation(i,\ j) - Cur(i,\ j)| \geq DIFF\_TH \end{cases};$$

where MotionResult(i,j) is a result of filtering the current sub-region at coordinate (i,j) (that is, a filtering result of the motion region), DIFF_TH is a difference degree threshold. When an absolute value of a difference between a value Compensation(i,j) that can be used to compensate the current sub-region at the coordinate (i,j) and the sub-region Cur(i,j) at the coordinate (i,j) in the current image is less than the difference degree threshold DIFF_TH, MotionResult(i,j)=Compensation (i,j), which represents that the degree of difference is determined to be small, and the method proceeds to step S126 to compensate the motion region with the similar part (i.e., Compensation(i,j)). When the absolute value of the difference between the value Compensation(i,j) that can be used to compensate the current sub-region at the coordinate (i,j) and the sub-region Cur(i,j) at the coordinate (i,j) in the current image is greater than or equal to the difference degree threshold DIFF_TH, MotionResult(i,j)=SpatialDenoise (i,j), which represents that the degree of difference is determined to be large, and the method proceeds to step S127 to perform the spatial-domain filtering operation. That is to say, after spatial-domain filtering is performed on the current sub-region at the coordinate (i,j), a spatial-domain filtering result SpatialDenoise(i,j) is obtained.

In step S127, the spatial-domain filtering operation can, for example, utilize mean filtering, as shown in the following equation (11):

$$SpatialDenoise(i,\ j) = \frac{\sum_{i-r}^{i+r}\sum_{j-r}^{j+r}Cur(a,\ b)}{(2\times r + 1)^2};\qquad \text{Equation (11)}$$

where SpatialDenoise(i,j) is the spatial-domain filtering result of the current sub-region at the coordinate (i,j), and Cur(a,b) is a value of the sub-region at coordinate (a,b). In equation (11), the values of all the sub-region within a region with a radius r are summed and averaged based on a total quantity of the sub-regions within the region of the radius r.

Next, the filtering results of the motion region in steps S126 and S127 can be combined as a result of filtering processing for the motion region. The filtering process for the motion region and the stationary region comes to an end.

Finally, the video noise reduction method proceeds to step S13: outputting the filtered stationary region and the motion region to generate the filtered current image. This step can be shown by the following equation (12):

$$FinalResult(i,\ j) = \begin{cases} MotionResult(i,\ j), \text{Motion}(i,\ j) == 1 \\ TemporalDenoise(i,\ j), \text{otherwise} \end{cases};\qquad \text{Equation (12)}$$

where FinalResult(i,j) represents a value of the filtered current image at the coordinate (i,j), MotionResult(i,j) is a filtering result of the sub-region at the coordinate (i,j) for the motion region, TemporalDenoise(i,j) is a time-domain filtering result of the region located at the coordinate (i,j).

Beneficial Effects of the Embodiments

In conclusion, the video noise reduction method and video noise reduction system based on the portrait mode provided by the present disclosure can combine portrait mode technology with the noise reduction technology to achieve a clear and excellent image quality.

Furthermore, an image is divided into three regions (the contour region, the foreground region, and background region) through the portrait mode, and these three regions are adjusted to different degrees during the motion detection, and finally the time-domain filtering, the spatial-domain filtering and/or the compensation processing are utilized for the stationary region and the motion region, so as to effectively suppress noises in the entire image, and the ghosting effect can be reduced.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A video noise reduction method based on a portrait mode, the video noise reduction method comprising: configuring a processor to perform:

inputting a current image into a portrait mode model to generate a current portrait probability image, wherein the current portrait probability image defines a probability that each sub-region in the current input image belongs to a foreground portrait;

performing a post-processing process, including:

performing a binarization process on the current portrait probability image according to a probability threshold to generate a mask image; and performing a contour extraction process to extract a foreground region, a background region and a contour region;

performing a filtering process, including:

performing a motion detection process to compare the current image with a previous image, and locate a motion region and a stationary region from the current image according to the extracted foreground region, the background region and the contour region;

performing a time-domain filtering operation on the stationary region;

obtaining, for the motion region, a similar part of the previous image that is similar to the current image and obtaining a degree of difference of the similar part, so as to determine whether to compensate the motion region with the similar part or to perform a spatial domain filtering operation; and outputting the filtered stationary region and the motion region to generate the filtered current image.

2. The method according to claim 1, further comprising: reducing the current image from a first image size to a second image size corresponding to the portrait mode model and then inputting the reduced current image into the portrait mode model; wherein the post-processing process further includes performing an enlarging step to enlarge the current portrait probability image from the second image size to the first image size, and then performing the binarization process.

3. The method according to claim 1, wherein, in the current portrait probability image, the probability that each sub-region of the current image is the foreground portrait is represented by a value ranging from 0 to 1.

4. The method according to claim 2, wherein the binarization process includes setting each sub-region having the probability that is greater than or equal to the probability threshold in the current portrait probability image as a first value, and setting each sub-region having the probability that is smaller than the probability threshold as a second value, so as to generate the mask image, which has a plurality of mask sub-regions corresponding to the sub-regions of the current portrait probability image.

5. The method according to claim 3, wherein the mask image is divided into a plurality of blocks, and for each of the blocks, the contour extraction process includes:

calculating and obtaining a quantity of the mask sub-regions that correspond to a current block and are set to the first value, and taking the quantity as a foreground region quantity of the current block; and calculating a foreground ratio of the foreground region to the current block to determine whether the current block belongs to the foreground region, the background region or the contour region.

6. The method according to claim 5, wherein, in response to the foreground ratio being within a contour ratio range, determining that the current block belongs to the contour region; in response to the foreground ratio being greater than an upper limit of the contour ratio range, determining that the current block belongs to the foreground region; and in response to the foreground ratio being smaller than a lower limit of the contour ratio range, determining that the current block belongs to the background region.

7. The method according to claim 1, wherein the foreground region, the background region and the contour region correspond to different weights, and for each region in the current image, the motion detection process includes:

determining whether a current region belongs to the foreground region, the background region or the contour region; and weighting a comparison result between the current image and the previous image according to the corresponding weights to locate the motion region and the stationary region.

8. The method according to claim 1, wherein the current image is a current frame image, and the previous image is a previous frame image processed by the post-processing process and the filtering process.

9. The method according to claim 8, wherein the time-domain filtering operation includes: assigning proportions of the current image and the previous image for each sub-region according to a learning rate.

10. The method according to claim 1, wherein the step of obtaining, for the motion region, the similar part of the previous image that is similar to the current image and obtaining the degree of difference of the similar part further includes:

for each sub-region corresponding to the motion region, locating another sub-region from the previous image that is similar to a current sub-region, and obtaining a difference between the found another sub-region and the current sub-region;

compensating, in response to the difference being less than a predetermined difference threshold, the current sub-region of the motion region with the another sub-region; and performing, in response to the difference being greater than or equal to the predetermined difference threshold, the spatial-domain filtering operation on the current sub-region of the motion region.

11. A video noise reduction system based on a portrait mode, the video noise reduction system comprising:

a processor; and a memory storing a plurality of computer-readable instructions, a current image and a previous image, wherein, the processor is configured to read the computer-readable instructions, and perform the following steps:

inputting a current image into a portrait mode model to generate a current portrait probability image, wherein the current portrait probability image defines a probability that each sub-region in the current input image belongs to a foreground portrait;

performing a post-processing process, including:

performing a binarization process on the current portrait probability image according to a probability threshold to generate a mask image; and performing a contour extraction process to extract a foreground region, a background region and a contour region;

performing a filtering process, including:

performing a motion detection process to compare the current image with the previous image, and locate a motion region and a stationary region from the current image according to the extracted foreground region, the background region and the contour region;

performing a time-domain filtering operation on the stationary region;

obtaining, for the motion region, a part of the previous image that is similar to the current image and obtaining a difference between the part and the current image; wherein, when the difference is less than a predetermined difference threshold, the motion region is compensated with the part, and when the difference is greater than or equal to the predetermined difference threshold, a spatial domain filtering operation is performed on the motion region; and outputting the filtered stationary region and the motion region to generate the filtered current image.

12. The system according to claim 11, wherein the processor is further configured to perform:

reducing the current image from a first image size to a second image size corresponding to the portrait mode model and then inputting the reduced current image into the portrait mode model; wherein the post-processing process further includes performing an enlarging step to enlarge the current portrait probability image from the second image size to the first image size, and then performing the binarization process.

13. The system according to claim 11, wherein, in the current portrait probability image, the probability that each sub-region of the current image is the foreground portrait is represented by a value ranging from 0 to 1.

14. The system according to claim 13, wherein the binarization process includes setting each sub-region having the probability that is greater than or equal to the probability threshold in the current portrait probability image as a first value, and setting each sub-region having the probability that is smaller than the probability threshold as a second value, so as to generate the mask image, which has a plurality of mask sub-regions corresponding to the sub-regions of the current portrait probability image.

15. The system according to claim 14, wherein the mask image is divided into a plurality of blocks, and for each of the blocks, the contour extraction process includes:

calculating and obtaining a quantity of the mask sub-regions that correspond to a current block and are set to the first value, and taking the quantity as a foreground region quantity of the current block; and calculating a foreground ratio of the foreground region to the current block to determine whether the current block belongs to the foreground region, the background region or the contour region.

16. The system according to claim 15, wherein, when the foreground ratio is within a contour ratio range, the current block is determined to belong to the contour region, when the foreground ratio is greater than an upper limit of the contour ratio range, the current block is determined to belong to the foreground region, and when the foreground ratio is smaller than a lower limit of the contour ratio range, the current block is determined to belong to the background region.

17. The system according to claim 11, wherein the foreground region, the background region and the contour region correspond to different weights, and for each region in the current image, the motion detection process includes:

determining whether a current region belongs to the foreground region, the background region or the contour region; and weighting a comparison result between the current image and the previous image according to the corresponding weights to locate the motion region and the stationary region.

18. The system according to claim 11, wherein the current image is a current frame image, and the previous image is a previous frame image processed by the post-processing process and the filtering process.

19. The system according to claim 18, wherein the time-domain filtering operation includes: assigning proportions of the current image and the previous image for each sub-region according to a learning rate.

20. The system according to claim 11, wherein the step of obtaining, for the motion region, the part of the previous image that is similar to the current image and obtaining the difference between the part and the current image further includes:

for each sub-region corresponding to the motion region, locating another sub-region from the previous image that is similar to a current sub-region, and obtaining a difference between the found another sub-region and the current sub-region;

compensating, in response to the difference being less than a predetermined difference threshold, the current sub-region of the motion region with the another sub-region; and performing, in response to the difference being greater than or equal to the predetermined difference threshold, the spatial-domain filtering operation on the current sub-region of the motion region.

\* \* \* \* \*